(12) United States Patent
Rangwala et al.

(10) Patent No.: US 12,177,334 B2
(45) Date of Patent: Dec. 24, 2024

(54) SECURE END-TO-END COMMUNICATION USING A SECURE EDGE APPLIANCE

(71) Applicant: Hughes Network Systems, LLC, Germantown, MD (US)

(72) Inventors: Mustafa Rangwala, New Market, MD (US); George Joseph Choquette, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 185 days.

(21) Appl. No.: 18/067,582

(22) Filed: Dec. 16, 2022

(65) Prior Publication Data

US 2024/0204987 A1 Jun. 20, 2024

(51) Int. Cl.
*H04L 9/32* (2006.01)
*H04L 9/08* (2006.01)
*H04L 51/222* (2022.01)

(52) U.S. Cl.
CPC .......... *H04L 9/0825* (2013.01); *H04L 9/3226* (2013.01); *H04L 51/222* (2022.05)

(58) Field of Classification Search
CPC ... H04L 9/0825; H04L 9/3226; H04L 51/222; H04L 9/0894; H04L 63/107; H04L 63/0442
See application file for complete search history.

(56) References Cited

U.S. PATENT DOCUMENTS

| 9,002,018 B2 * | 4/2015 | Wilkins | H04L 9/0891 |
| | | | 713/168 |
| 2022/0247729 A1 * | 8/2022 | Hsu | H04L 9/0827 |

FOREIGN PATENT DOCUMENTS

WO   WO-2021181176 A1 * 9/2021 ........... H04L 9/0825

OTHER PUBLICATIONS

Pereira, Mafalda (Authorized Officer), International Search Report and Written Opinion issued in International Patent Application No. PCT/US2023/079867 dated Feb. 21, 2024, 11 pages.

\* cited by examiner

*Primary Examiner* — Nelson S. Giddins
(74) *Attorney, Agent, or Firm* — MH2 Technology Law Group, LLP

(57) ABSTRACT

A method, device, and non-transitory computer-readable medium are provided. Responsive to the device determining that a first user is not registered in a node registry upon startup, a public key of the first user and private key of the first user are generated, and the public key is registered in the node registry. Responsive to receiving a lookup request from a securely connected computing device, a public key lookup request for a public key of a second user is sent to the node registry by the device. The device receives the public key of the second user responsive to the sending of the public key lookup request. Responsive to receiving a message for the second user and an encryption request from the computing device, the device encrypts the message using the public key of the second user to produce an encrypted message that is transmitted to the computing device.

20 Claims, 13 Drawing Sheets

SECURE END-TO-END COMMUNICATION USING A SECURE EDGE APPLIANCE

FIELD OF THE INVENTION

The implementations relate to a method, a secure edge appliance, and a non-transitory computer-readable media for providing secure end-to-end communications between at least two computing devices. More particularly, the implementations relate to a method and a secure edge appliance for identifying a public cryptographic key of an intended recipient and encrypting a message or file using the public cryptographic key before the message or the file is sent to the intended recipient. Further, the implementations relate to a method and a secure edge appliance for receiving a message or file encrypted using a public key of a receiving user, decrypting the message or file using a private cryptographic key of the receiving user, and providing the decrypted message or file to the receiving user.

BACKGROUND

Currently, when two users desire to communicate securely, they each may generate public and private keys and may purchase respective certificates from a certificate authority. The certificate authority is a trusted entity that issues digital certificates used to cryptographically link an entity with a public key. The certificate is renewed periodically such as, for example, annually. Users may load their certificate into, for example, their email client, and may repeat this step for each computer they use. If the two users desire to securely communicate emails with each other, the two users exchange certificates, which each include the public key of the user who owns the certificate. The two users then may send email messages to each other using the public key of the receiving user to encrypt the email message. The receiving user receives the encrypted email message and decrypts the email message using the receiving user's private key.

There are a number of problems that may occur when setting up an email client to use certificates. For example, certificate purchasing and loading tends to be cumbersome. In addition, a certificate authority chain tends to become broken. As a result, email clients may frequently reject certificates due to a broken certificate authority chain or an expired certificate. Users may think that their email client has been properly setup, but emails may often be sent unencrypted without the user realizing a lack of encryption. Sending an email from one user to multiple users may require much prior negotiation regarding an exchange of certificates among the multiple users. As a result, some users may not bother to properly set up certificates for secure communications.

When sharing a file with a second user, a first user may encrypt the file using a tool, which may include, but not be limited to, WinZip® (registered to Niko Mac of Bristol, CT), 7Zip, or Microsoft Word. Next, a key or password used to encrypt the file may be sent unencrypted via email or a text message to the second user. The encrypted file then may be sent to the second user via email or may be uploaded to storage in a cloud. The second user enters the key or the password to decrypt the file from email or the storage in the cloud. However, users tend to find this workflow to be tedious, and instead, send files unencrypted or upload unencrypted files to cloud storage. Further, sending unencrypted keys or passwords is itself not secure. In addition, users tend to select simple to remember passwords, which may be easily hacked, and users may forget passwords over time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first aspect of embodiments, a method for providing end-to-end communications is provided. A first device is securely connected to a computing device. In response to determining, upon startup of the first device, that a first user of the first device is not registered in a node registry, the first device generates a public key of the first user and a private key of the first user, and registers the public key of the first user in the node registry. Responsive to receiving a lookup request from the computing device, the device sends a public key lookup request for a public key of a second user to the node registry. Responsive to sending the public key lookup request to the node registry, the device receives the public key of the second user. Responsive to receiving a message for the second user from the computing device and a request to encrypt the message, the first device encrypts the message using the public key of the second user to produce an encrypted message, and transmits the encrypted message to the computing device for sending to the second user.

In a second aspect of embodiments, a device is provided for end-to-end communications. The device includes a processor, a port for connecting the device with a computing device, and a memory having instructions stored therein for the processor to perform operations. According to the operations, in response to determining that a first user of the device is not registered with a node registry upon startup, the device generates a public key of the first user and a private key of the first user, and registers the public key of the first user in the node registry. Responsive to receiving a lookup request from a securely connected computing device, the device sends a public key lookup request for a public key of a second user to the secure node registry. Responsive to the sending a public key lookup request to the node registry for a public key of a second user, the public key of the second user is received by the device. Responsive to receiving a message from the computing device for the second user and a request to encrypt the message, the message is encrypted by the device using the public key of the second user to produce an encrypted message that is transmitted to the computing device for sending to the second user. A request to decrypt a second encrypted message and the second encrypted message are received from the computing device, wherein the second encrypted message is encrypted using the public key of the first user. Responsive to the receiving of the request to decrypt the second encrypted message, the second encrypted message is decrypted by the device using the private key of the first user to produce a decrypted message. The decrypted message is transmitted to the computing device.

In a third aspect of embodiments, a non-transitory computer-readable medium is provided that has instructions stored therein for a processor of a first device to perform operations. According to the operations, upon startup of the first device securely connected with a computing device and responsive to determining that a first user of the first device is not registered in a node registry, a public key of the first user and a private key of the first user are generated, and the public key of the first user is registered in the node registry. Responsive to receiving a lookup request from a securely connected computing device, the device sends a public key lookup request for a public key of a second user to the node registry. Responsive to sending the public key lookup request to the node registry, the public key of a second user is received. Responsive to receiving a message for the second user from the computing device and a request to encrypt the message, the message is encrypted by the device to produce an encrypted message that is transmitted to the computing device for sending to the second user.

BRIEF DESCRIPTION OF THE DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
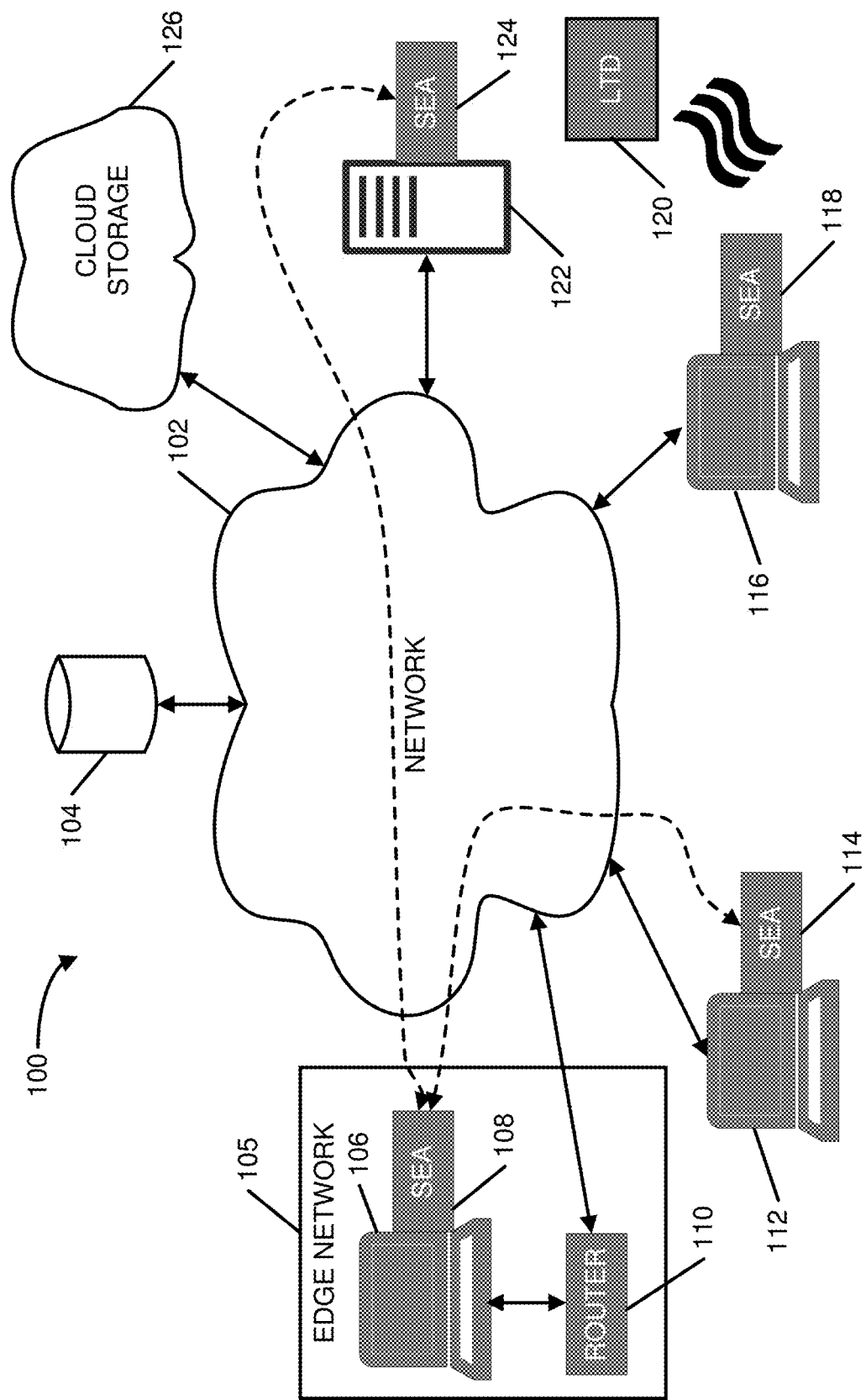
FIG. 1 illustrates an example environment 100 in which embodiments may operate.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

Embodiments provide a first secure edge appliance (SEA) device that provides secure digital communications between a first computing device securely attached to the first SEA device and a second computing device securely attached to a second SEA device. When an SEA device first starts up after being attached to a computing device, the SEA sends a prompt to the attached computing device to prompt the user to enter an unlock password that unlocks the SEA device for use.

After being unlocked for use, the SEA device may attempt to authorize each user of the device. Each of the users may have a corresponding user profile stored in a memory of the SEA device, which may include a user ID, a user email address, and a user password. For each of the users, the SEA device may send an authentication request via the attached computing device to an authenticating device. The authenticating device may send an authentication confirmation message to the SEA device via the attached computing device to thereby cause the SEA device to wait to detect a first use of the SEA device by a user. Upon detecting the first use, the SEA device may prompt the user to provide a second password or biometric identification information, which may include, but not be limited to, a fingerprint, a voice print, a retinal scan, or a facial scan. Upon receiving an expected password or an expected biometric identification, the SEA device may be fully authenticated for a user.

When the SEA device starts up, the SEA device may determine whether each user of the SEA device is registered with a secure node (snode) registry. The SEA device may send, as a pass through via the attached computing device, a request for a public key of each of the users to the snode registry. The request may include a messaging ID (e.g., a user ID or an email address) of the user. If the user is registered, the snode registry may respond with a public key of the user. Otherwise, the snode registry may respond with an unregistered indication to the SEA device via the attached computing device.

If the user is unregistered, the SEA device may generate a public key and corresponding private key for the user and may issue a certificate including the user's public key, which may be provided to the snode registry by the SEA device via the attached computing device to register the user's public key. The SEA device may encrypt messages to be sent to a receiving user using a public key of the receiving user and may decrypt received encrypted messages for a local receiving user using a private key of the local receiving user.

The SEA device further may encrypt files to be shared with a second user by using the second user's public key or a session key to encrypt the file before providing the encrypted file to cloud storage for the second user to access and decrypt, via the second user's corresponding SEA device.

In some embodiments, the SEA device may perform encryption and decryption only when the SEA device is located at an authorized location or is located near a trusted device.

EMBODIMENTS

FIG. 1 shows an example environment 100 in which various embodiments may operate. Environment 100 may include a network 102, SEA devices 108, 114, and 118, each of which may be attached to respective computing devices 106, 112, and 118. Computing device 106 may be included in an edge network 105 and may be connected with a router 110. Computing devices 112 and 116 also may be included in edge network 105 or may be included in different edge networks (not shown) and may further be connected to network 102 via respective routers (not shown). Each of computing devices 106, 112, and 116 may be connected with their respective routers either via wired means or wirelessly. Snode registry 104 may be connected to network 102. Snode registry 104 may process public key lookup requests originating from SEA devices (e,g., SEA devices 108, 114, 118) and may process registration requests to register public keys of users of the SEA devices 108, 114, 118. A cloud storage device 126 may reside in a cloud that may be connected to network 102. Cloud storage device 126 may be used for storing encrypted files to be shared with other users of SEA devices.

SEA devices may be in a form of a USB dongle in some embodiments. In other embodiments, SEA devices may be in a form of a small ethernet switch. In yet other embodiments, SEA devices may be in other forms.

In embodiments in which SEA devices are not physically attached to respective computing devices, the SEA devices may be connected to their respective computing devices via Bluetooth® (Bluetooth is a registered trademark of BLUETOOTH SIG, INC., a Delaware Corporation), WiFi, or other wireless technology. In some of these embodiments, communications from the SEA device to the connected computing device may be encrypted using a public key of the computing device, and communications from the computing device to the SEA device may be encrypted using the public key of the SEA device or the public key of a user of the SEA device if the communications are intended for the user. Similarly, in these same embodiments, communications from the SEA device to the computing device may be decrypted by the computing device using a private cryptographic key of the computing device, and the SEA device may decrypt encrypted communications from the connected computing device using the private key of the SEA device or the private key of a user of the SEA device if the communications are intended for the user.

Local trusted device (LTD) 120 may be a device such as a smartphone, a personal computer, or other type of computing device capable of communicating using Bluetooth® or WiFi. In some embodiments, LTD 120 may periodically wirelessly send messages to local SEA devices. The local SEA devices may become disabled (i.e., unable to encrypt and decrypt messages) if messages from LTD 120 have not been seen for at least a predetermined period of time. Alternatively, each local SEA device may periodically send a query message to local LTD device 120. If no response is received by a respective local SEA device after N number of attempts, the respective local SEA device may be disabled (e.g., prevented from encrypting and decrypting messages).

SEA device 124, connected to a server may have different functionality than SEA devices 108, 114, and 118 connected to computing devices 106, 112, and 116, respectively, as will be discussed in more detail below.

Figure 2:
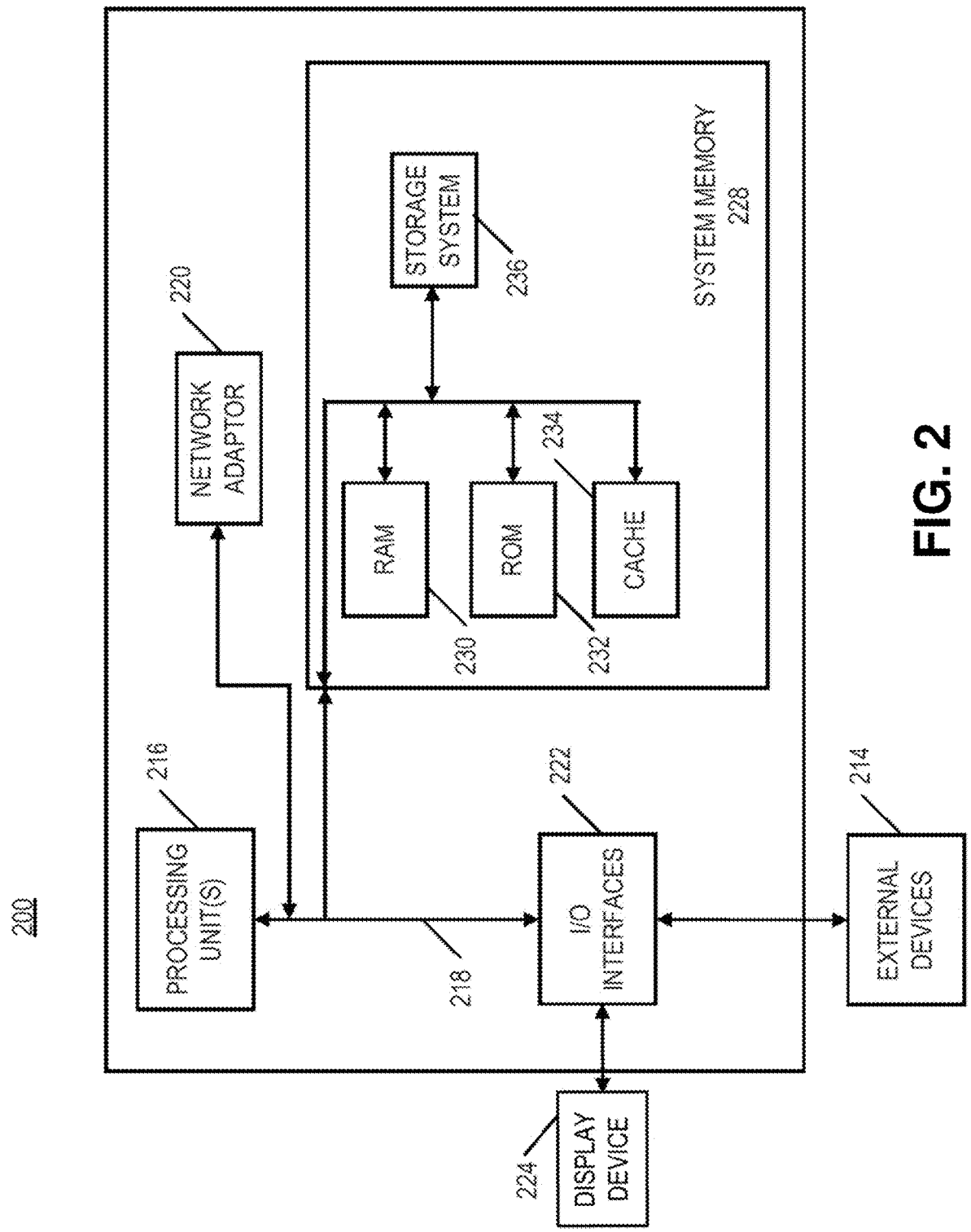
FIG. 2 is a functional block diagram of a computing device that may implement any of computing devices 108, 112, 116, server 122, and a secure node registry 104 of FIG. 1 according to embodiments.

FIG. 2 is a functional block diagram of a computing device that may implement any of computing devices 108, 112, 116, server 122, or a secure node registry 104. Computing system 200 is shown in a form of a general-purpose computing device. Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various non-transitory computer-readable media, which may be any available non-transitory media accessible by computing system 200. The computer-readable media may include volatile and non-volatile non-transitory media as well as removable and non-removable non-transitory media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a nonremovable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, an SEA device, as well as a network card, a modem, etc. that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
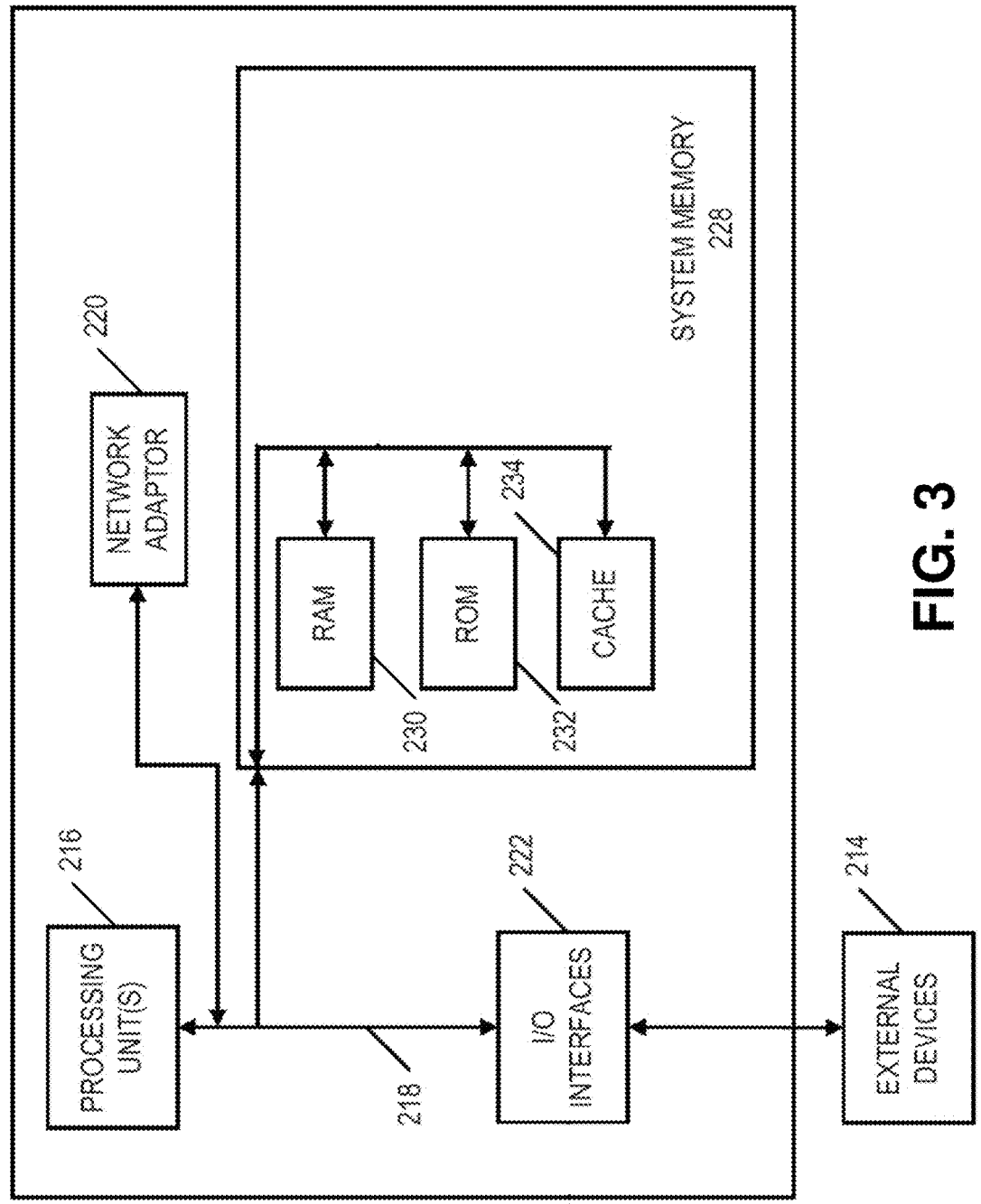
FIG. 3 is a functional block diagram of a secure edge appliance device according to embodiments.

FIG. 3 is a functional block diagram of an SEA device 300 according to embodiments. Reference numerals that are the same as those used in FIG. 2 indicate the same components. External devices 214 may include any of computing devices 106, 112, 116 as well as other devices.

Figure 4A:
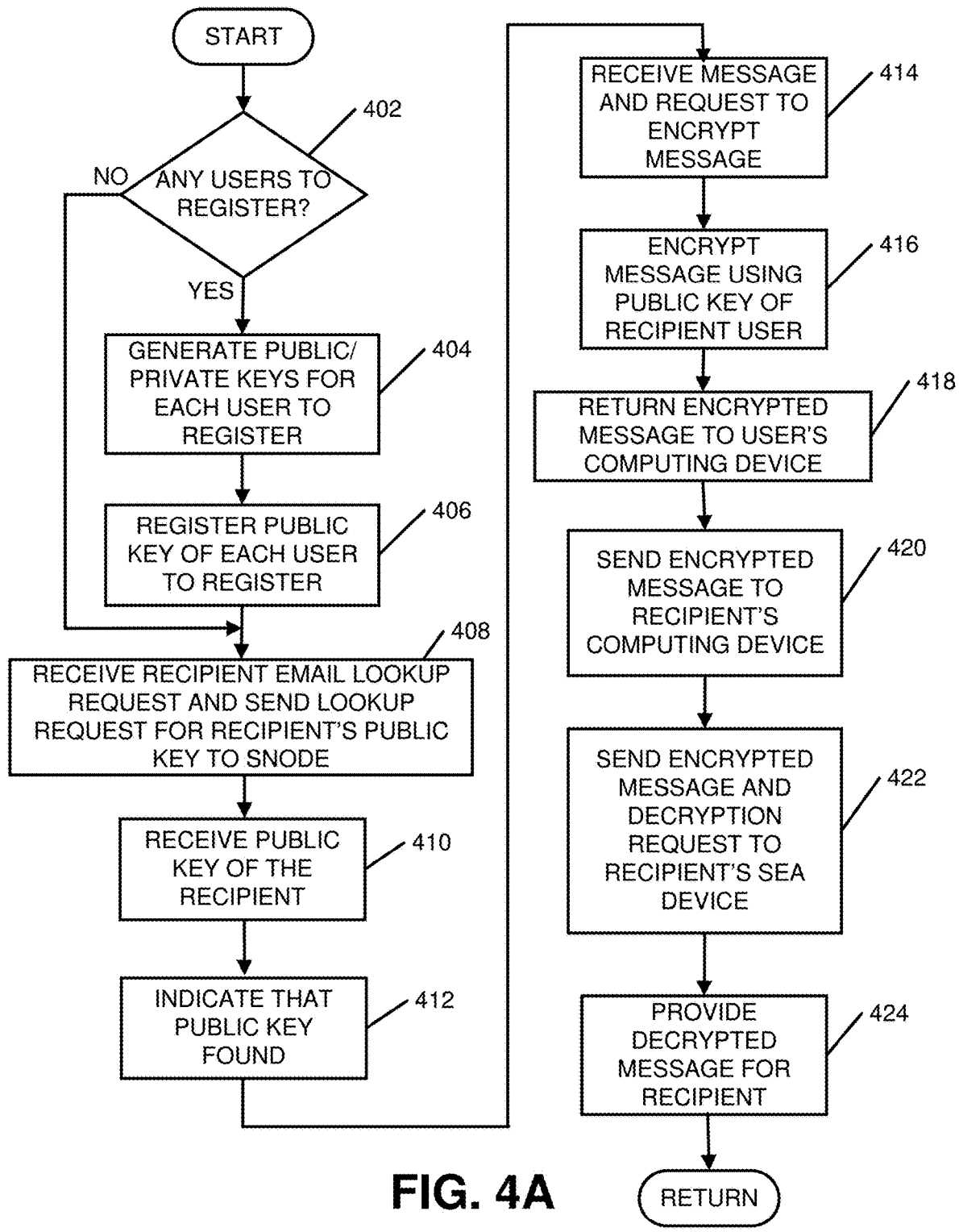
FIG. 4A is a flowchart of an example process that may be performed in embodiments of secure edge appliance devices to register users of the secure edge appliance device and to encrypt messages.

FIG. 4A is a flowchart of an example process that may be performed in embodiments. The process may begin with an SEA device determining whether any users of the SEA device are to be registered (act 402). The SEA device may determine whether a user of the SEA device is registered with an snode registry by obtaining messaging IDs (e.g., user IDs or email addresses) of users of the SEA device via user profiles stored in the SEA device, and generating and sending a public key lookup request to the snode registry via a computing device securely connected with the SEA device. The snode registry may respond with a corresponding public key or an unregistered indication, which may be received by the SEA device via the securely connected computing device.

A computing device is securely connected to an SEA device when security measures are in place to prevent unauthorized access to communications between the computing device and the SEA device. As an example, an SEA device that is physically attached to a computing device such that no other devices could intercept communications therebetween is securely connected to the computing device. As another example, an SEA device and a computing device are securely connected when all communications therebetween are encrypted such that no other devices could intercept unencrypted communications between the SEA device and the computing device.

If the SEA device receives an unregistered indication in response to the public key lookup request, the SEA device may generate a public and private key for the user (act 404). The public key may be used to encrypt messages or files intended for the user. The private key may be used to decrypt received encrypted messages and encrypted files intended for the user. The SEA device may send a certificate including the user's public key to the snode registry, via the computing device, to register the public key of the user (act 406). The private key may be kept only by the SEA device.

In various embodiments, a memory store for storing private keys of registered users of an SEA device is tamper resistant, such that the private keys cannot be extracted and used by an unauthorized process.

After determining that a message is intended for a recipient user, a messaging client (e.g., an email client) executing on the computing device may send and the SEA device may receive an email lookup request using an email address of the recipient user, and in response, the SEA device may send a public key lookup request for a public key of the recipient user to the snode registry (act 408). In response to sending the public key lookup request to the snode registry, the SEA device may receive the public key of the recipient user, which is associated with the email address of the recipient user (act 410). The SEA device then may send a public key found message to the messaging client executing on the computing device to indicate that the public key of the recipient user was found (act 412). The SEA device then may receive the message from the messaging client along with a request to encrypt the message (act 414). The SEA device then may encrypt the message using the public key of the recipient user (act 416) and may return the encrypted message to the messaging client executing on the securely connected computing device (act 418). The messaging client may send the encrypted message to a recipient user's messaging client executing on a recipient user's computing device (act 420). The messaging client executing on the recipient user's computing device may send the encrypted message and a decryption request to a recipient user's SEA device to be decrypted (act 422). The recipient user's SEA device may decrypt the message using the recipient user's private cryptographic key and may provide the decrypted message to the recipient user's messaging client for delivery to the recipient user (act 424).

Figure 4B:
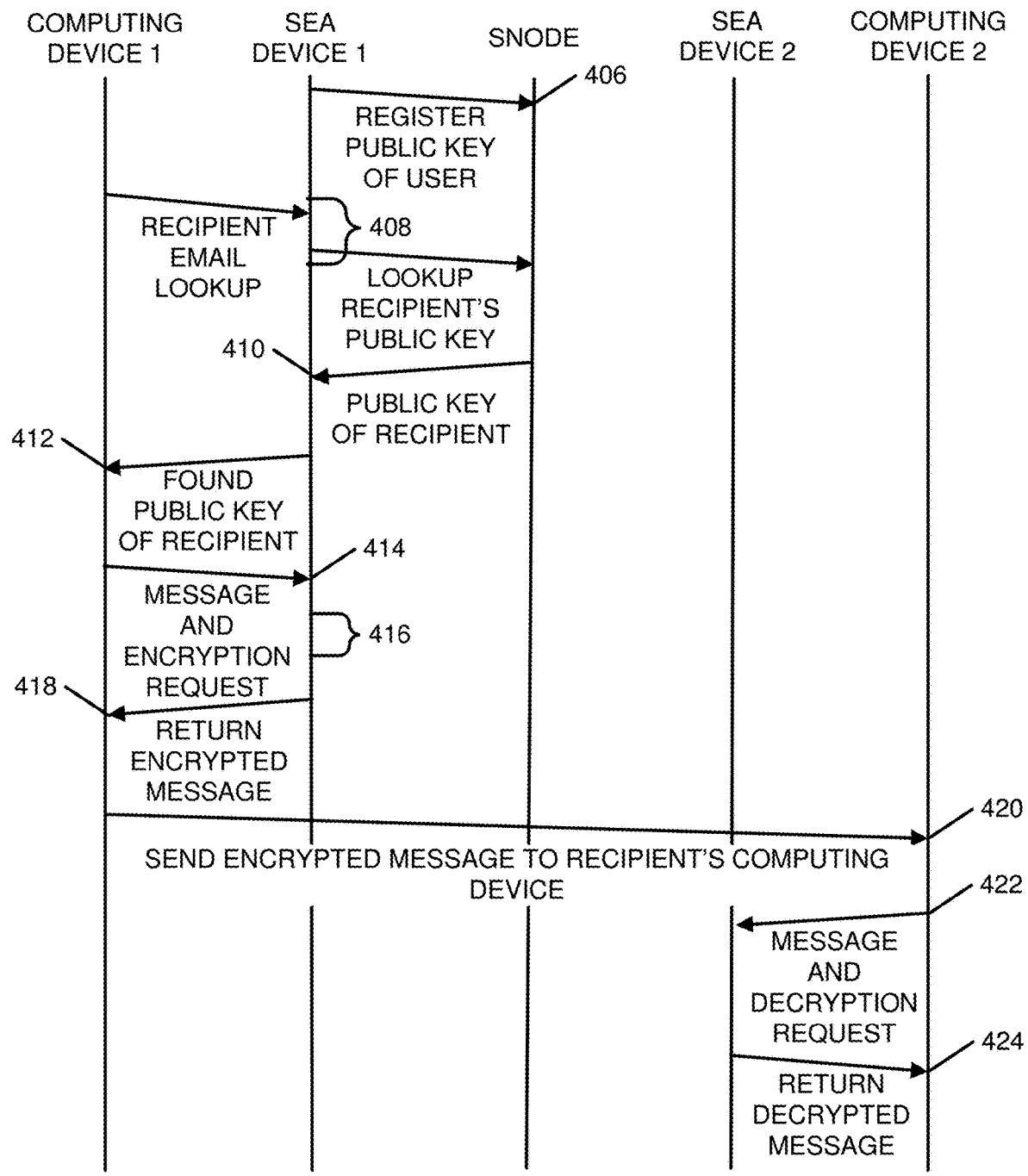
FIG. 4B is a traffic flow diagram that illustrates a flow of messages among devices according to an embodiment.

FIG. 4B illustrates example communications among computing device 1, SEA device 1 securely connected with computing device 1, snode registry, SEA device 2 securely connected with computing device 2, and computing device 2.

In various embodiments, communications between an SEA device and an snode registry may pass through a computing device that is securely connected with the SEA device. The SEA device and the snode registry may be securely connected such that the communications between the SEA device and the snode registry are encrypted and authenticated. Communications in FIG. 4B may begin with SEA device 1 sending a request to register a public key of a user in the snode registry (act 406).

Sometime later, a messaging client executing in computing device 1 may desire to send a message to a recipient user of computing device 2 and the messaging client may send a recipient email lookup request to SEA device 1, which sends a public key lookup request for the recipient user's public key to the snode registry (act 408). The snode registry may return the recipient user's public key to SEA device 1 (act 410), which sends a found indication to the messaging client executing on computing device 1 to indicate that the public key of the recipient user was found (act 412).

In some embodiments, SEA devices may cache looked up public keys so that repeated public key lookups for already looked up public keys may be avoided. In some of these embodiments, the cache may have a time to live attribute, which will cause the SEA devices to 'refresh' their caches after a certain period of time has passed by querying the registry again.

After the messaging client executing on computing device 1 receives the found indication, SEA device 1 may receive a message and an encryption request from the messaging client (act 414). SEA device 1 then may encrypt the message to form an encrypted message (act 416). SEA device 1 may send the encrypted message to the messaging client executing on computing device 1 (act 418). The messaging client then may send the encrypted message to a recipient user's messaging client executing on computing device 2 (act 420). The messaging client executing on computing device 2 may send the encrypted message and a decryption request to decrypt the encrypted message to SEA device 2 (act 422). SEA device 2 then may decrypt the encrypted message to form a decrypted message and may return the decrypted message to the messaging client executing on computing device 2 (act 424). The messaging client executing on computing device 2 may deliver the decrypted message to the recipient user (act 424).

In an alternate embodiment, SEA devices may include transceivers for communicating directly with the snode registry. In such embodiments, an SEA device may directly register SEA device users' public keys in the snode registry and may directly send a public key lookup request to the snode registry to lookup a public key of another user in response to receiving a user email lookup request from a messaging client executing on a securely connected computing device.

Figure 5:
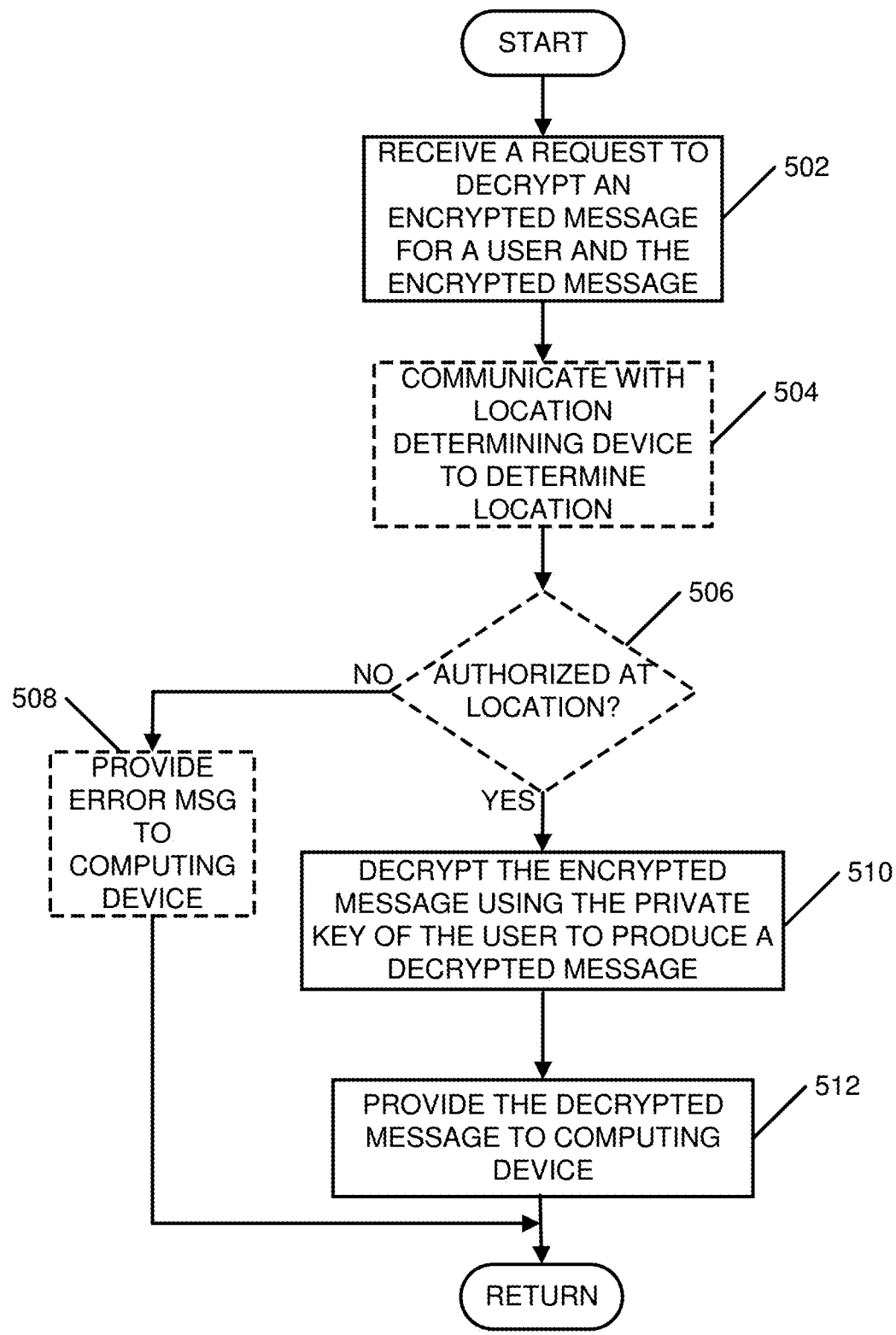
FIG. 5 is a flowchart of an example process performed by a secure edge appliance device for decrypting encrypted messages provided to the secure edge appliance device when the secure edge appliance device is located at an authorized location according to an embodiment.

In some embodiments, SEA devices may only perform encryptions and decryptions when located at authorized locations. FIG. 5 is a flowchart of an example process that may be performed in such embodiments. The process may begin with an SEA device receiving a request to decrypt an encrypted message and the encrypted message from a messaging client of a securely connected computing device (act 502).

The SEA device may securely communicate with a location determining device such that the location determining device can be 'trusted' and to determine a location of the SEA device (act 504). The location determining device may include, but not be limited to, a nearby smartphone that has a connection with the SEA device and that executes an app that communicates with global positioning (GPS) satellites to determine a location of the smartphone, or a GPS module executing in the SEA device, or any other processing device that communicates with GPS satellites. In some embodiments, the SEA device may be connected with a location determining device via a near communication means, e.g., Bluetooth® (Bluetooth is a registered trademark of Bluetooth Sig. Inc., a Delaware corporation). In such embodiments, the SEA device may include a Bluetooth® transceiver.

The SEA device then may determine whether the determined location is a location at which the SEA device is authorized to perform encryption and decryption (act 506). If the location is determined not to be an authorized location, then the SEA device may provide an error message to the securely connected computing device indicating that the SEA device is located at an unauthorized location (act 508). Otherwise, the SEA device may decrypt the encrypted message using the private key of the user of the SEA device to produce a decrypted message (act 510). The SEA device then may provide the decrypted message to a messaging client executing on the securely connected computing device (act 512).

In some embodiments, acts 504, 506, and 508 may not be performed. In such embodiments, after receiving the encrypted message at act 502, the SEA device, may perform acts 510 and 512 to decrypt the encrypted message to produce the decrypted message and provide the decrypted message to the messaging client executing on the securely connected computing device. In these embodiments, there is no check to determine whether the SEA device is located at an authorized location.

Figure 6:
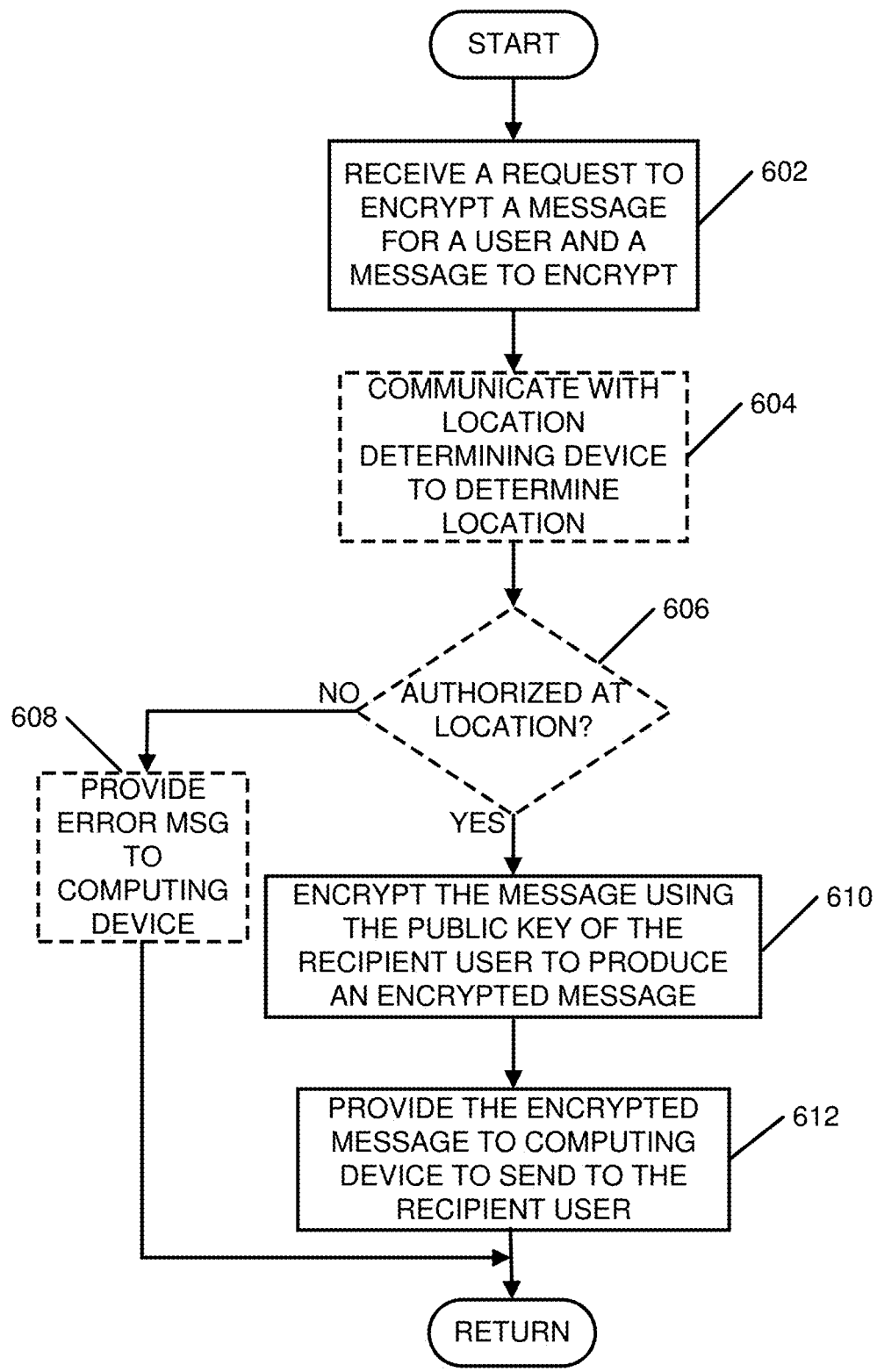
FIG. 6 is a flowchart of an example process performed by a secure edge appliance device for encrypting messages provided to the secure edge appliance device when the secure edge appliance device is located at an authorized location according to an embodiment.

FIG. 6 is a flowchart of a process for an SEA device to receive an unencrypted message and encrypt the message to produce an encrypted message only if the SEA device is located at a location at which the SEA device is authorized to encrypt and decrypt messages. The process may begin with the SEA device receiving a request to encrypt a message along with the message to be encrypted from a messaging client executing on a computing device that is securely connected with the SEA device (act 602). Similar to act 504, the SEA device, may communicate with the location determining device to determine a location (act 604). The location determining device may return a current location to the SEA device.

The SEA device then may determine whether the current location is a location at which the SEA device is authorized to encrypt and decrypt messages (act 606). Such a mechanism will allow for a more 'trusted' electronic message exchange that is tied to a physical location, thus electronically mimicking an equivalent for a registered and signature authorized postal mail delivery service. If the SEA device determines that it is located at a location at which it is not authorized to encrypt and decrypt messages, then the SEA device may provide an error message to the securely connected computing device indicating that the SEA device is at an unauthorized location (act 608). Otherwise, if the SEA device is determined to be located at an authorized location, then the SEA device may request and receive the public key of the intended recipient of the message and may encrypt the message using the received public key to produce an encrypted message (act 610), and may provide the encrypted message to the messaging client to send the encrypted message to a messaging client executing on another computing device securely connected with another SEA device (act 612).

In some embodiments, acts 604, 606, and 608 may not be performed. In such embodiments, after receiving the unencrypted message at act 602, the SEA device, may perform acts 610 and 612 to encrypt the unencrypted message to produce the encrypted message and provide the encrypted to the messaging client executing on the securely connected computing device. In these embodiments, there is no check to determine whether the SEA device is located at an authorized location.

Figure 7:
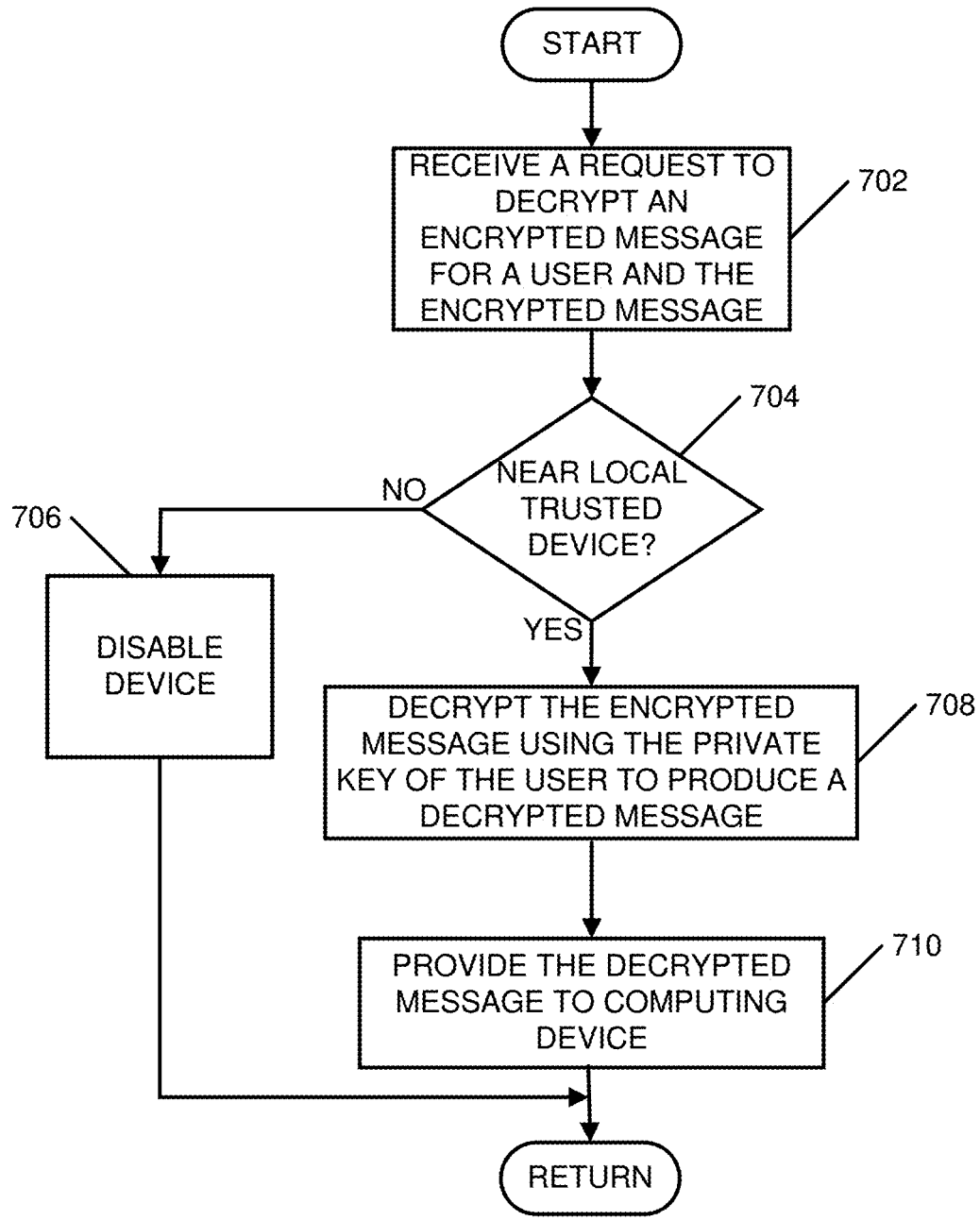
FIG. 7 is a flowchart of an example process performed by a secure edge appliance device for decrypting received encrypted messages when the secure edge appliance device is located near a trusted device according to an embodiment.

FIG. 7 is a flowchart of an example process that may be performed by an SEA device in an embodiment in which the SEA device will perform encryption and decryption only when the SEA device is located near a local trusted device (LTD). The LTD may include, but not be limited to a smartphone, a computing device, or other device capable of communicating via a near only communication means with the SEA device. The near only communication means may include Bluetooth®, WiFi, or other near communication means.

The process may begin with the SEA device receiving a request to decrypt an encrypted message for a user of the SEA device from a messaging client executing on a computing device securely connected with the SEA device (act 702). The SEA device then may determine whether the SEA device is located near the LTD (act 704).

In some embodiments, the LTD may periodically send a message indicating a presence of the trusted device, wherein the message may be received by all nearby SEA devices. The message may be sent every predefined time period including, but not limited to, every 5 seconds, every 10 seconds, every 60 seconds, or a different predefined time period. If the message from the LTD had been received by the SEA device in at least a second predefined time period that is larger than the predefined time period, but less than or equal to a multiple of the predefined time period (e.g., twice the predefined time period), then the SEA device may consider itself to be near the LTD.

In other embodiments, the SEA device may poll the LTD for a response. If a response is received by a previously defined time period, then the SEA device may consider itself to be near the LTD. If a response is not received within the previously defined time period, the SEA device may again poll the LTD for a response. If N polls had been transmitted with no response from the LTD, then the SEA device may consider itself to not be near the LTD. In various embodiments, N may be 3, 5, 7 or another appropriate number.

During act 704, the SEA device may determine whether it is near the LTD. If the SEA device determines that it is not near the LTD, then the SEA device may be disabled (act 706). In this specification, an SEA device is disabled when it will not perform encryption and decryption of messages, but will instead return an error message to a securely connected computing device indicating that the SEA device is not located near the LTD.

If, during act 704, the SEA device determines that it is near the LTD, then the SEA device may decrypt the encrypted message using a private key of the user of the SEA device to produce a decrypted message (act 708). The SEA device then may provide the decrypted message to a messaging client executing on the securely connected computing device (act 710) for delivery to the user.

Figure 8:
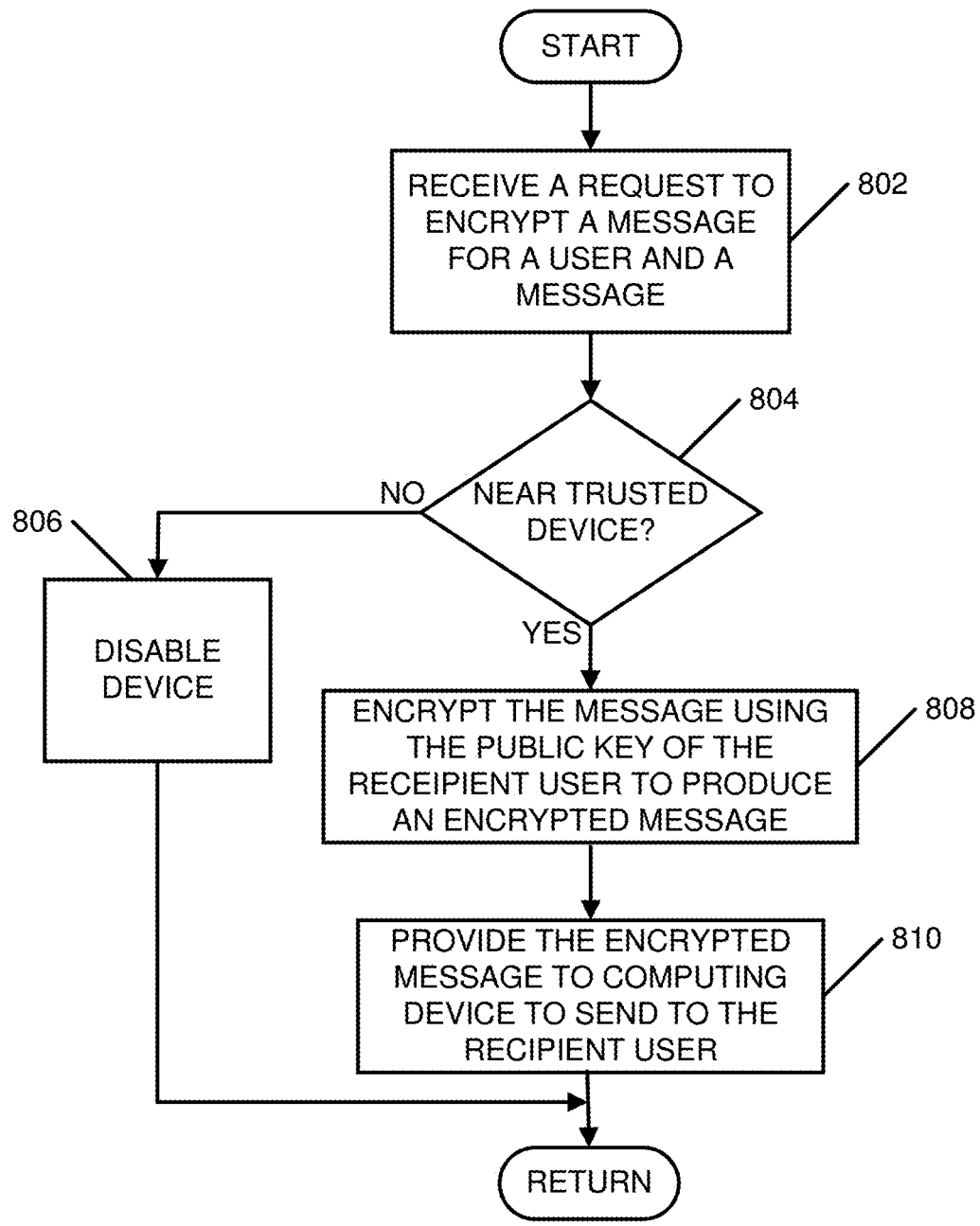
FIG. 8 is a flowchart of an example process performed by a secure edge appliance device for encrypting received messages when the secure edge appliance device is located near a trusted device according to an embodiment.

FIG. 8 is a flowchart of another example process that may be performed by an SEA device in an embodiment in which the SEA device will perform encryption and decryption only when the SEA device is located near an LTD.

The process may begin with the SEA device receiving a request to encrypt a message, along with the message, for a user of the SEA device (act 802). Similar to act 704, the SEA device may determine whether it is located near the LTD (act 804). This may be done in a same manner as previously described with respect to act 704.

If the SEA device determines that it is not near the LTD, then the SEA device may be disabled such that the SEA device may not perform encryptions and decryptions (act 806). Otherwise, if the SEA device determines that it is near the LTD, then the SEA device may encrypt the message using a requested and received public key of a recipient user to produce an encrypted message (act 808). The encrypted message may be provided by the SEA device to a messaging client executing on a securely connected computing device for sending to a second messaging client executing on a second computing device of the recipient user (act 810).

Figure 9:
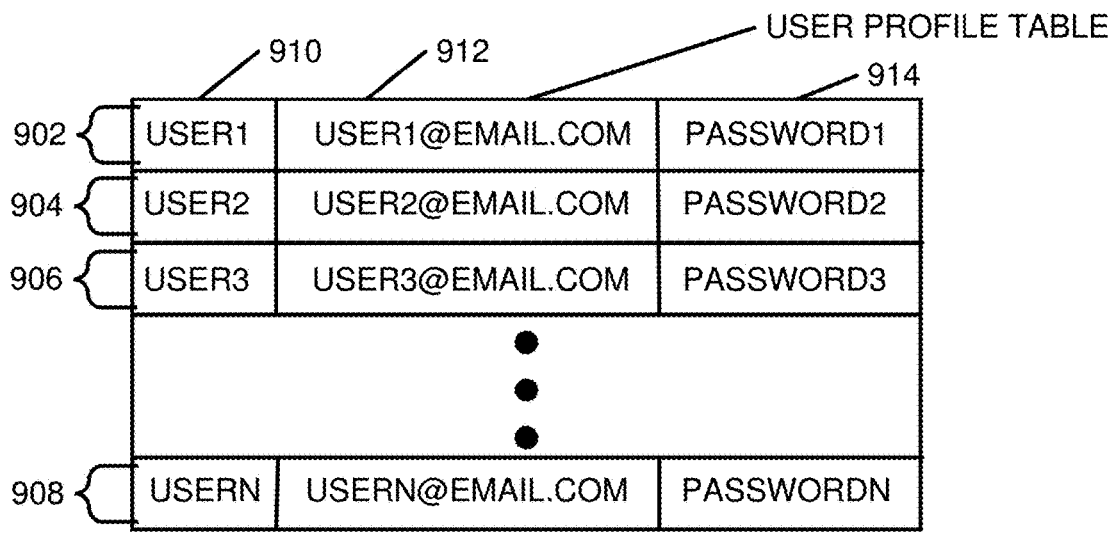
FIG. 9 shows an example user profile table according to an embodiment.

In some embodiments, a user profile table may reside in a memory of the SEA device. FIG. 9 shows a user profile table according to an embodiment. The user profile table may include an entry for multiple users 902, 904, 906, 908 of the SEA device. Each entry may include a user ID 910, a user email address 912, and a user password 914.

In some embodiments, upon startup, the SEA device may send an authentication request for each user included in the user profile table via a securely connected computing device to an authenticating device (act 1002). The authentication request may include at least one of the user ID 910 and the user email address 912, as well as a hash of the user password 914. The authenticating device may include, but not be limited to, a server, a laptop, a smartphone, or other type of computing device. If the authenticating device determines that the received authentication request includes a correct user ID 910 or user email address 912 along with the correct corresponding hash of a password, then a successful authentication indication may be received by the SEA device via the securely connected computing device (act 1004) and the process may be completed. Otherwise, the authenticating device may provide an error message to the SEA device via the securely connected computing device (act 1006) and the process may be completed.

Figure 10:
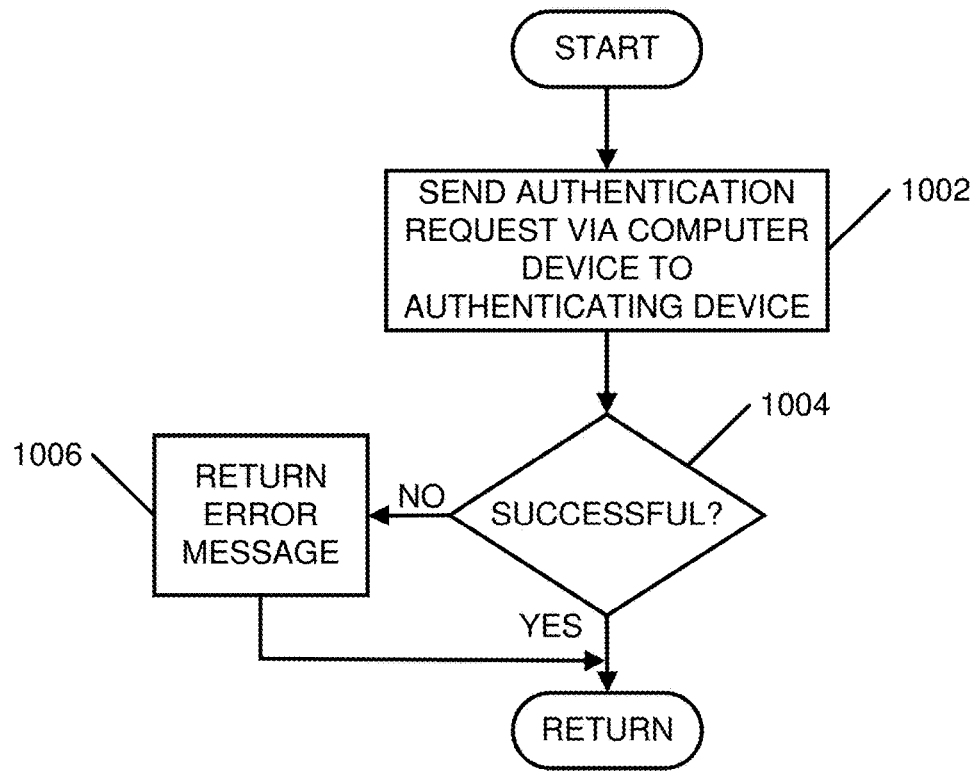
FIG. 10 illustrates an example process for authenticating a secure edge appliance device according to an embodiment.
Figure 11:
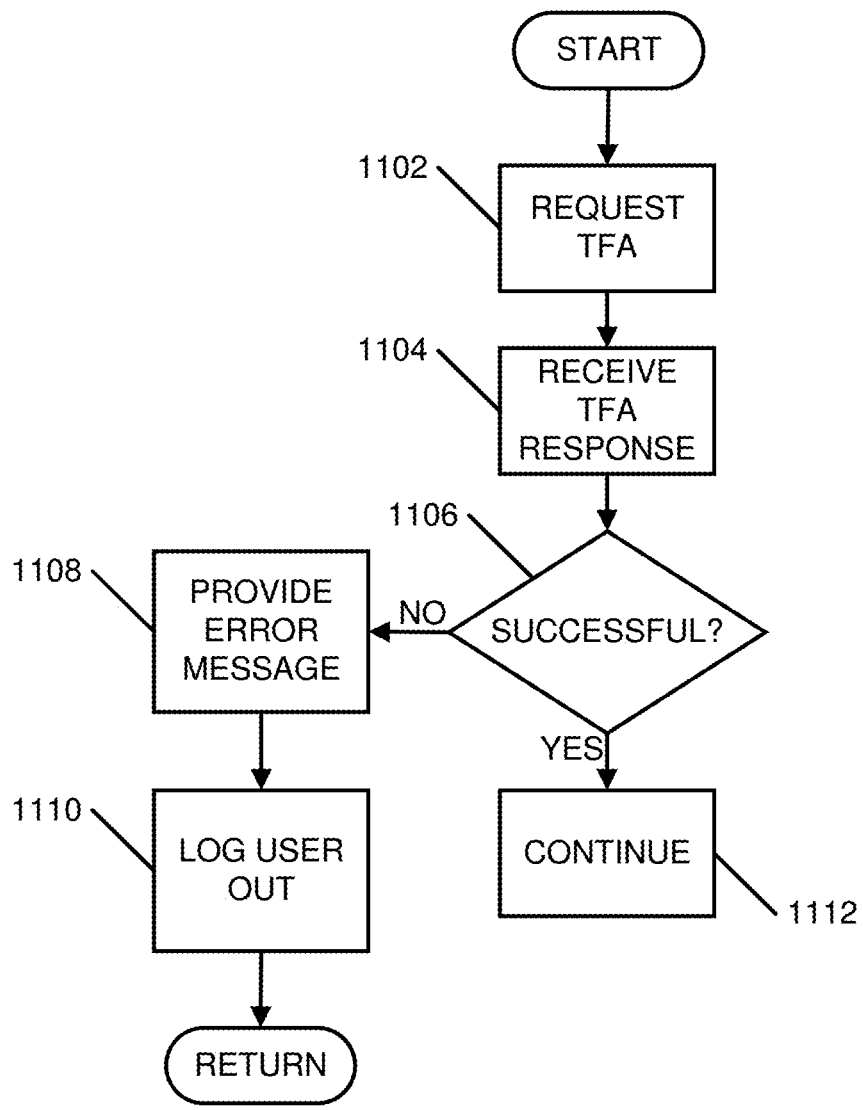
FIG. 11 shows an example process for performing two factor authentication of a secure edge appliance device according to an embodiment.

In an embodiment, additional security may be provided by using two factor authentication (TFA). For example, immediately after performing the process of FIG. 10, the SEA device may perform a process illustrated by a flowchart of FIG. 11.

The process may begin with the SEA device requesting a TFA response from the computing device securely connected with the SEA device (act 1102). The securely connected computing device may prompt the user to enter a TFA code that is being sent to the user via email, text message, an app executing on a smartphone, or via another means. The securely connected computing device may receive a TFA code from the user and the SEA device may receive the TFA code from the securely connected computing device (act 1104). The SEA device may compare the received TFA code with an expected TFA code and may determine that the TFA response is successful if the two TFA codes match (act 1106).

If, during act 1106, the TFA response is determined to be successful, then processing may be allowed to continue (act 1112). Otherwise, the SEA device may provide an error message to the securely connected computing device (act 1110) and the securely connected computing device may send messages to the authenticating device and the SEA device to log out the user. At a later time, the user may cause the SEA device to again attempt to authenticate the user by causing an authentication initiation message to be sent from the securely connected computing device to the SEA device with at least one of a user ID and an email address of the user.

In an alternate embodiment, instead of the user being asked to enter a TFA code, the user may be asked to provide biometric identification via the securely connected computing device, including, but not limited to, a fingerprint, a retinal scan, a voiceprint, or other biometric identification.

Figure 12:
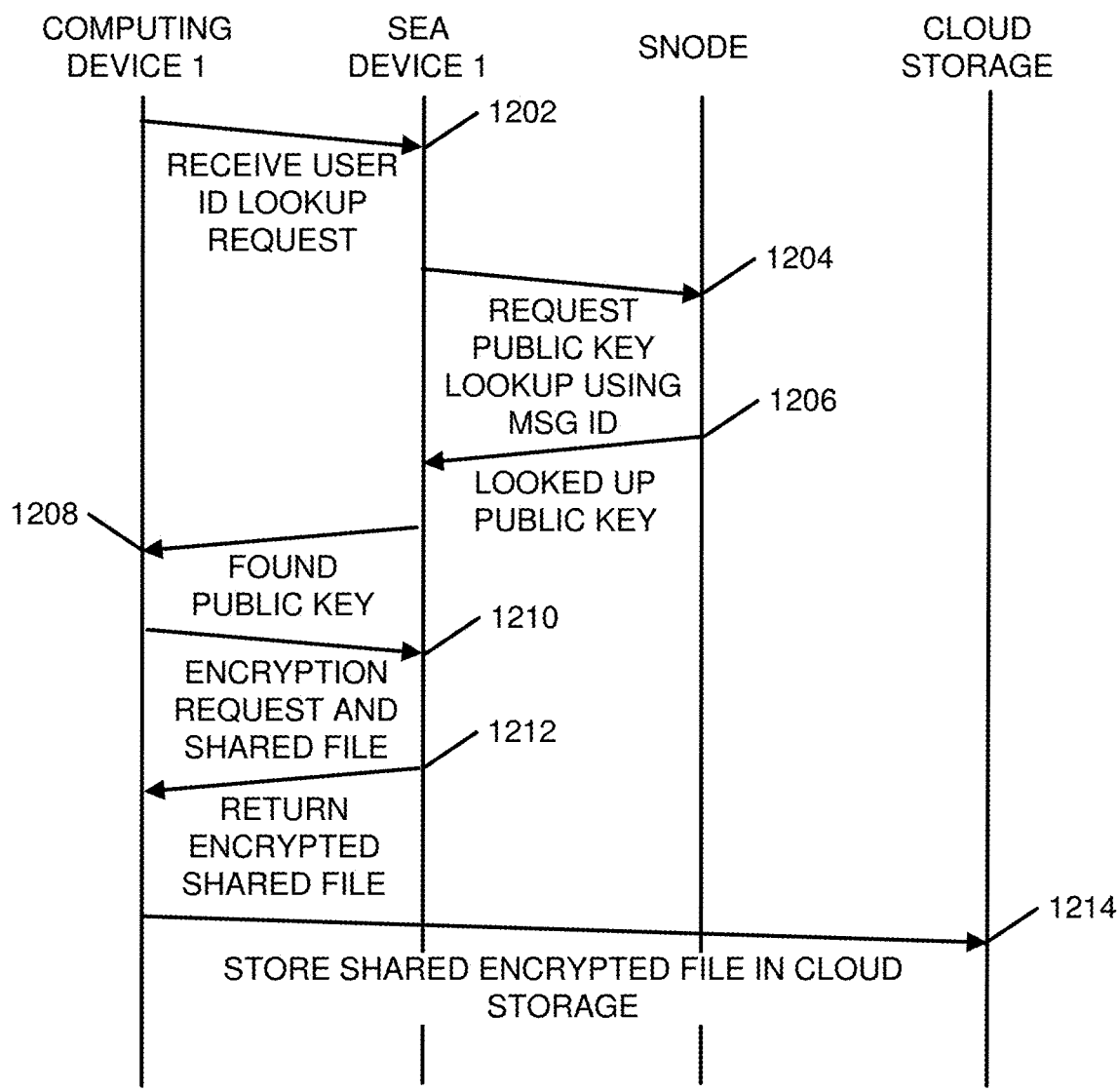
FIGS. 12 and 13 show example traffic flows among devices with respect to secure file sharing according to an embodiment.

In an embodiment, a user may securely share a file with a second user. FIG. 12 is a flow diagram that illustrates an example traffic flow in the embodiment. The process may begin with SEA device 1 receiving a messaging ID (e.g., a user ID or an email address) lookup request from computing device 1, which is securely connected with SEA device 1 (act 1202). SEA device 1 may send a request for a public key corresponding to the messaging ID to an snode registry (act 1204). The snode registry may respond to SEA device 1 with a public key that corresponds to the messaging ID (act 1206). SEA device 1 then may send a found public key message to computing device 1 to indicate that the corresponding public key was found (act 1208). The computing device 1 then may send and the SEA device 1 may receive a request to encrypt the shared file along with the shared file (act 1210). SEA device 1 then may encrypt the shared file using the public key and may return the encrypted file to computing device 1 (act 1212). Computing device 1 then may store the encrypted file in cloud storage indicating that the file is to be shared with a user corresponding to the messaging ID (act 1214).

Figure 13:
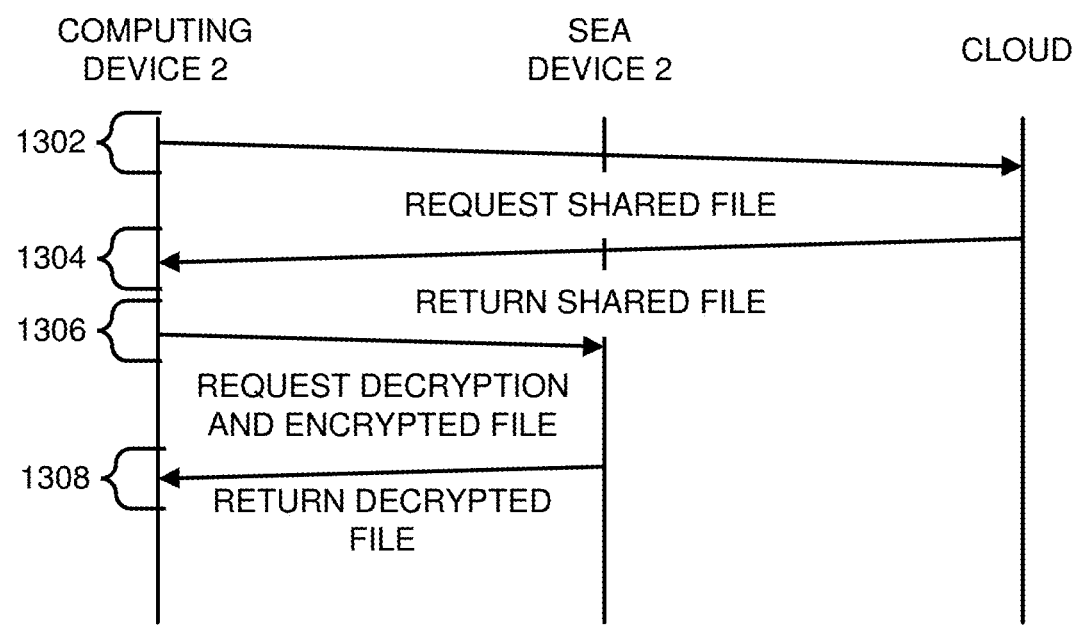

FIG. 13 shows a traffic flow diagram illustrating example traffic among computing device 2, SEA device 2, and cloud storage with respect to requesting and decrypting the shared encrypted file.

Computing device 2 of the second user with whom the file is being shared requests the shared file from cloud storage (act 1302). In response, the cloud storage may return the shared encrypted file to the computing device 2 (act 1304). The computing device 2 then may send a decryption request along with the encrypted file to SEA device 2 (act 1306), which decrypts the encrypted file using a private key of the second user to produce a decrypted file and return the decrypted file to the computing device 2 (act 1308).

The above described method works well when sharing a file with one other user. However, because the public key of the second user is used to encrypt the file, the file can only be decrypted using the private key of the second user. Thus, the user who shared the file cannot open and edit the encrypted file in cloud storage.

In an alternate scenario, a shared session key generated by SEA device 1 may be used to encrypt the file. The shared session key may be encrypted by SEA device 1 using the second user's public key and sent to the second user. SEA device 2 of the second user may decrypt the session key and store the session key internally. As a result, both SEA device 1 and SEA device 2 may assist a sharing user and the second user to decrypt and edit the shared file.

The above alternate approach may be used with a group of second users with whom a file is being shared. For example, SEA device 1 may generate a session key, may encrypt the session key N times for N users using each second user's public key, and may send a respective encrypted session key to each corresponding second user. At this point, SEA device 1 may encrypt the file using the session key to form an encrypted file, and may store the encrypted file in the cloud storage. Now, all users may be able to access and decrypt the stored encrypted file using their respective SEA devices and the session key.

SEA devices also may be securely connected with servers that may provide one or more services. To avoid confusion with the previously discussed SEA devices, we refer to these SEA devices connected with a server as version 2 SEA (V2 SEA) devices and the previously discussed SEA devices as version 1 SEA (V1 SEA) devices. In an embodiment, the V2 SEA devices are very similar to V1 SEA devices. However, the V2 SEA devices may not include a user profile table as previously discussed, and may not request authentication of users of the V2 SEA devices. Each V2 SEA device may generate public and private keys for the V2 SEA device. Each of the V2 SEA devices may issue a respective certificate that includes its public key, which it provides to an snode registry, so that the snode registry may register the received public keys for each of the V2 SEA devices. Secure communications sent to a server having a securely connected V2 SEA device may be encrypted using the public key assigned to the V2 SEA device and may be decrypted by the V2 SEA device using the private key assigned to the V2 SEA device. Before communicating with a V2 SEA device, a V1 SEA device securely connected to a computing device may provide a public key lookup request to the snode registry that passes through the securely connected computing device to obtain a public cryptographic key of the V2 SEA device, which then may be provided to the V1 SEA device. The computing device then may provide messages for the V2 SEA device to the securely connected V1 SEA device to be encrypted. Encrypted messages received by the computing device from the V2 SEA device may be provided to the securely connected V1 SEA device to be decrypted using a private key of a user of the V1 SEA device and then returned to the computing device.

CONCLUSION

The enclosed embodiments provide a number of advantages over existing systems such as: preventing some embodiments of SEA devices from encrypting and decrypting messages while located at an unauthorized location; preventing some embodiments of SEA devices from encrypting and decrypting messages while not being located near a local trusted device; using two factor authentication by some SEA devices; generating automatic cryptographic certificates for users of embodiments of SEA devices; providing a lower bar of entry for users to setup secure end-to-end communication with each other, and making secure file sharing easier.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the implementations, rather than any specific examples given.

We claim:

1. A method for providing end-to-end communications, the method comprising:
   providing a first device securely connected to a computing device;
   responsive to determining that a first user of the first device is not registered in a node registry upon startup of the first device, performing by the first device:
      generating a public key of the first user and a private key of the first user, and
      registering the public key of the first user in the node registry;
   responsive to receiving a lookup request from the computing device, sending a public key lookup request for a public key of a second user to the node registry;
   receiving, by the first device, the public key of the second user in response to the sending of the public key lookup request to the node registry; and
   responsive to receiving of a message for the second user from the computing device and a request to encrypt the message:
      encrypting, by the first device, the message using the public key of the second user to produce an encrypted message, and
      transmitting the encrypted message to the computing device for sending to the second user.

2. The method of claim 1, further comprising:
   receiving, by the first device from the computing device, a request to decrypt a second encrypted message and the second encrypted message, the second encrypted message being encrypted using the public key of the first user;
   responsive to the receiving of the request to decrypt the second encrypted message, decrypting, by the first device, the second encrypted message using the private key of the first user to produce a decrypted message; and
   transmitting, by the first device, the decrypted message to the computing device.

3. The method of claim 2, further comprising:
   communicating, by the first device, with a location determining source to determine a location of the first device; and
   performing the decrypting of the second encrypted message when the determined location is a location at which the decrypting of the second encrypted message is permitted.

4. The method of claim 2, wherein the message for the second user and the second encrypted message are email messages.

5. The method of claim 1, wherein:
   the first device stores a plurality of user profiles, the plurality of user profiles including a user ID of a respective user, a respective email address of the respective user, and a password of the respective user.

6. The method of claim 5, further comprising:
upon startup, authenticating, by the first device, the first user with an authenticating device based on using a user profile of the first device, the user profile having stored therein the user id of the first user, the email address of the first user, and the password of the first user.

7. The method of claim 6, wherein the authenticating further comprises using two factor authentication when the first user attempts to use the first device.

8. The method of claim 1, wherein the first device is disabled when the first device is not located in proximity to a trusted device.

9. The method of claim 1, further comprising:
receiving, by the first device from the computing device, a file and a request to encrypt the file using a public key of a third user;
encrypting, by the first device, the file using the public key of the third user to produce an encrypted file; and
providing, by the first device, the encrypted file to the computing device for storing the encrypted file to a cloud storage for sharing with the third user.

10. The method of claim 1, further comprising:
receiving, by the first device from the computing device, a file and a request to share the file in a cloud storage with a third user;
determining a public key of the third user;
generating, by the first device, a session key for encrypting the file;
encrypting, by the first device, the file using the session key to produce an encrypted file;
encrypting, by the first device, the session key by using the public key of the third user to produce an encrypted session key;
sending, by the first device, the session key to the third user; and
providing, by the first device, the encrypted file to the computing device for storing the encrypted file to the cloud storage for sharing with the third user.

11. A device for providing end-to-end communications, the device comprising:
a processor;
a port for connecting the device with a computing device; and
a memory having instructions stored therein for the processor to perform operations comprising:
responsive to determining that a first user of the device is not registered with a node registry upon startup, performing:
generating a public key of the first user and a private key of the first user, and
registering the public key of the first user in the node registry;
responsive to receiving a lookup request from a securely connected computing device, sending a public key lookup request for a public key of a second user to the node registry;
receiving the public key of the second user in response to the sending of the public key lookup request to the node registry;
responsive to receiving a message for the second user from the computing device and a request to encrypt the message:
encrypting the message using the public key of the second user to produce an encrypted message, and
transmitting the encrypted message to the computing device for sending to the second user;
receiving from the computing device a request to decrypt a second encrypted message and the second encrypted message, the second encrypted message having been encrypted using the public key of the first user;
responsive to the receiving of the request to decrypt the second encrypted message, decrypting the second encrypted message using the private key of the first user to produce a decrypted message; and
transmitting the decrypted message to the computing device.

12. The device of claim 11, wherein the operations further comprise:
communicating with a location determining source to determine a location of the device; and
performing the decrypting of the second encrypted message when the determined location is a location at which the decrypting of the second encrypted message is authorized.

13. The device of claim 11, wherein the message for the second user and the second encrypted message are email messages.

14. The device of claim 11, wherein:
the device stores a plurality of user profiles, the plurality of user profiles including a user ID of a respective user, an email address of the respective user, and a password of the respective user.

15. The device of claim 14, wherein the operations further comprise:
upon startup, authenticating the first user with an authenticating device based on using a user profile of the device, the user profile having stored therein the user ID of the first user, the email address of the first user, and the password of the first user.

16. The device of claim 15, wherein the authenticating further comprises using two factor authentication when the first user attempts to use the device, the two factor authentication requiring the first user to provide one of a password, a passcode, and a biometric identification via a second device different from the device.

17. The device of claim 11, wherein the operations further comprise:
receiving, by the device from the computing device, a file and a request to encrypt the file;
determining a respective public key of each of a plurality of users;
encrypting, by the device, the file using a session key to produce an encrypted file;
encrypting, by the device, the session key by the respective public key of the each of the plurality of users to produce respective encrypted session keys;
transmitting, by the device, the respective encrypted session keys to the corresponding plurality of users; and
transmitting the encrypted file to the computing device for storing to cloud storage.

18. A non-transitory computer-readable medium having stored therein instructions for a processor of a first device to perform operations, the operations comprising:
upon startup of the first device securely connected with a computing device and responsive to determining that a first user of the first device is not registered in a node registry, performing by the first device:
generating a public key of the first user and a private key of the first user, and
registering the public key of the first user in the node registry;

responsive to receiving a lookup request from a securely connected computing device, sending a public key lookup request for a public key of a second user to the node registry;

receiving the public key of the second user in response to the sending of the public key lookup request to the node registry; and responsive to receiving of a message for the second user from the computing device and a request to encrypt the message:

encrypting the message using the public key of the second user to produce an encrypted message, and transmitting the encrypted message to the computing device for sending to the second user.

19. The non-transitory computer-readable medium of claim 18, wherein the operations further comprise:

receiving, from the computing device, a request to decrypt a second encrypted message and the second encrypted message, the second encrypted message having been encrypted using the public key of the first user;

responsive to the receiving of the request to decrypt the second encrypted message, decrypting the second encrypted message using the private key of the first user to produce a decrypted message; and transmitting the decrypted message to the computing device.

20. The non-transitory computer-readable medium of claim 19, wherein the operations further comprise:

upon startup, authenticating the first user with an authenticating device based on using a user profile of the first device, the user profile having stored therein a user ID of the first user, an email address of the first user, and a password of the first user, wherein:

the authenticating further comprises using two factor authentication when the first user attempts to use the first device.

* * * * *